United States Patent
Smith

[11] Patent Number: 5,841,441
[45] Date of Patent: Nov. 24, 1998

[54] HIGH-SPEED THREE-DIMENSIONAL TEXTURE MAPPING SYSTEMS AND METHODS

[75] Inventor: David A. Smith, Cary, N.C.

[73] Assignee: Virtus Corporation, Cary, N.C.

[21] Appl. No.: 588,997

[22] Filed: Jan. 19, 1996

[51] Int. Cl.$^6$ .................................................. G06T 17/30
[52] U.S. Cl. ........................................................ 345/430
[58] Field of Search ..................... 395/118, 119, 395/120, 125–131; 345/418, 419, 420, 425–431

[56] References Cited

U.S. PATENT DOCUMENTS

| | | | |
|---|---|---|---|
| 4,062,045 | 12/1977 | Iwane | 348/48 |
| 4,821,212 | 4/1989 | Heartz | 345/426 |
| 5,224,208 | 6/1993 | Miller, Jr. et al. | 345/425 |
| 5,283,640 | 2/1994 | Tilton | 348/42 |
| 5,339,386 | 8/1994 | Sodenberg et al. | 345/422 |
| 5,359,362 | 10/1994 | Lewis et al. | 348/15 |
| 5,359,526 | 10/1994 | Whittington et al. | 701/200 |
| 5,490,240 | 2/1996 | Foran et al. | 345/430 |

OTHER PUBLICATIONS

Pederson, Displacement Mapping Using Flow Fields, Computer Graphics, Jul. 1994, pp. 279–286.

Higuchi et al., Building 3–D Models from UnregisteredRange Images, Graphical Models and Image Processing, Jul. 1995, pp. 315–333.

Turk et al., Zippered Polygon Meshes from Range Images, Computer Graphics, Jul. 1994, pp. 311–318.

Maillot et al., Interactive Texture Mapping, Computer Graphics, Jul. 1993, pp. 27–34.

Foley et al., *Computer Graphics Principles and Practice, Second Edition*, 1990, pp. 471–529, 741–745.

*Primary Examiner*—Anton Fetting
*Attorney, Agent, or Firm*—Haynes and Boone, L.L.P.

[57] ABSTRACT

A three-dimensional texture is mapped onto a graphically-displayed surface by interpolating locations for elements of the texture using an associated distance relationship which locates the element with respect to the surface and a reference location spaced a distance apart from the surface. A first array of points representing the surface are stored, each of the points having an element of the three-dimensional texture and a distance to the element associated therewith. Upon a command to move the displayed surface, a new location for each point of the first array is computed, to obtain a second array representing the moved surface. A location for each element of the three-dimensional texture associated with each point of the first array is interpolated from the corresponding point in the second array and a reference location spaced apart from the moved surface.

7 Claims, 13 Drawing Sheets

FIG. 5
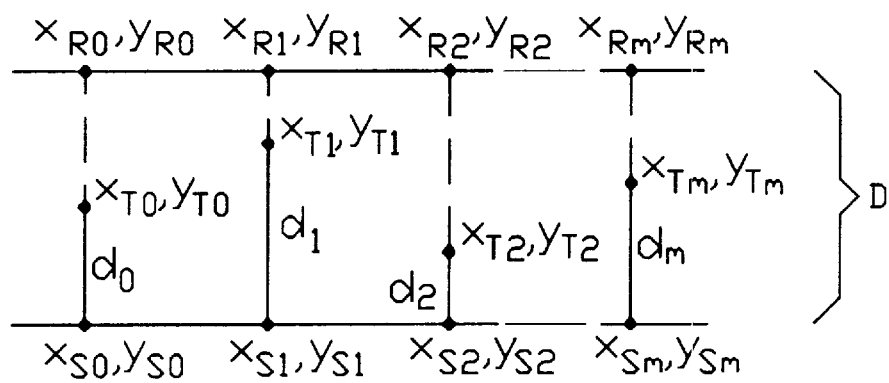
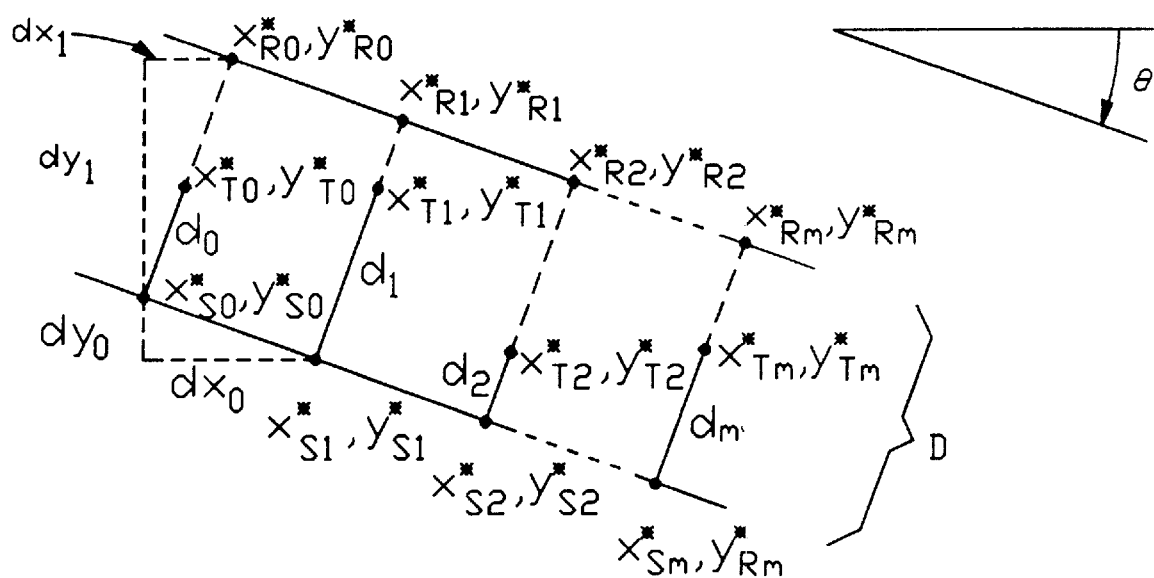

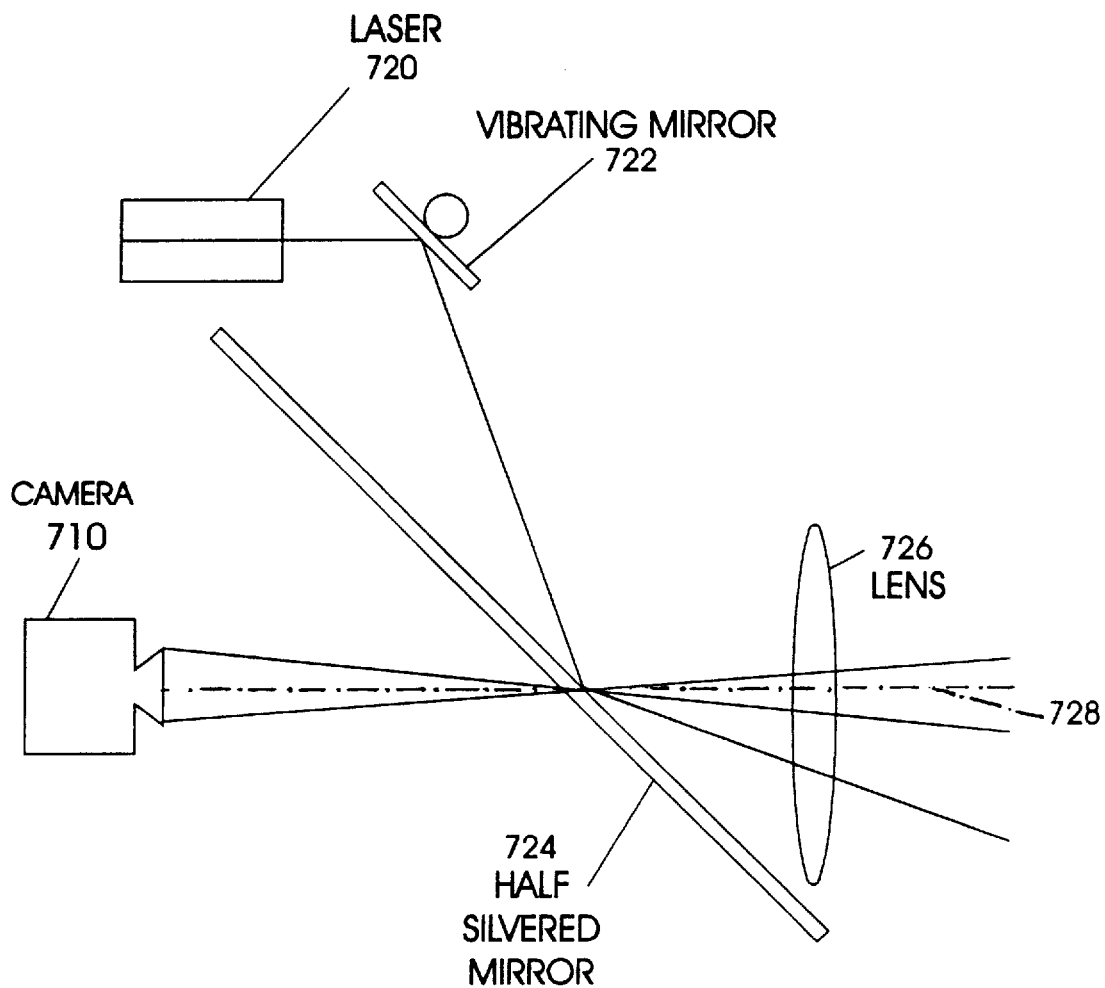

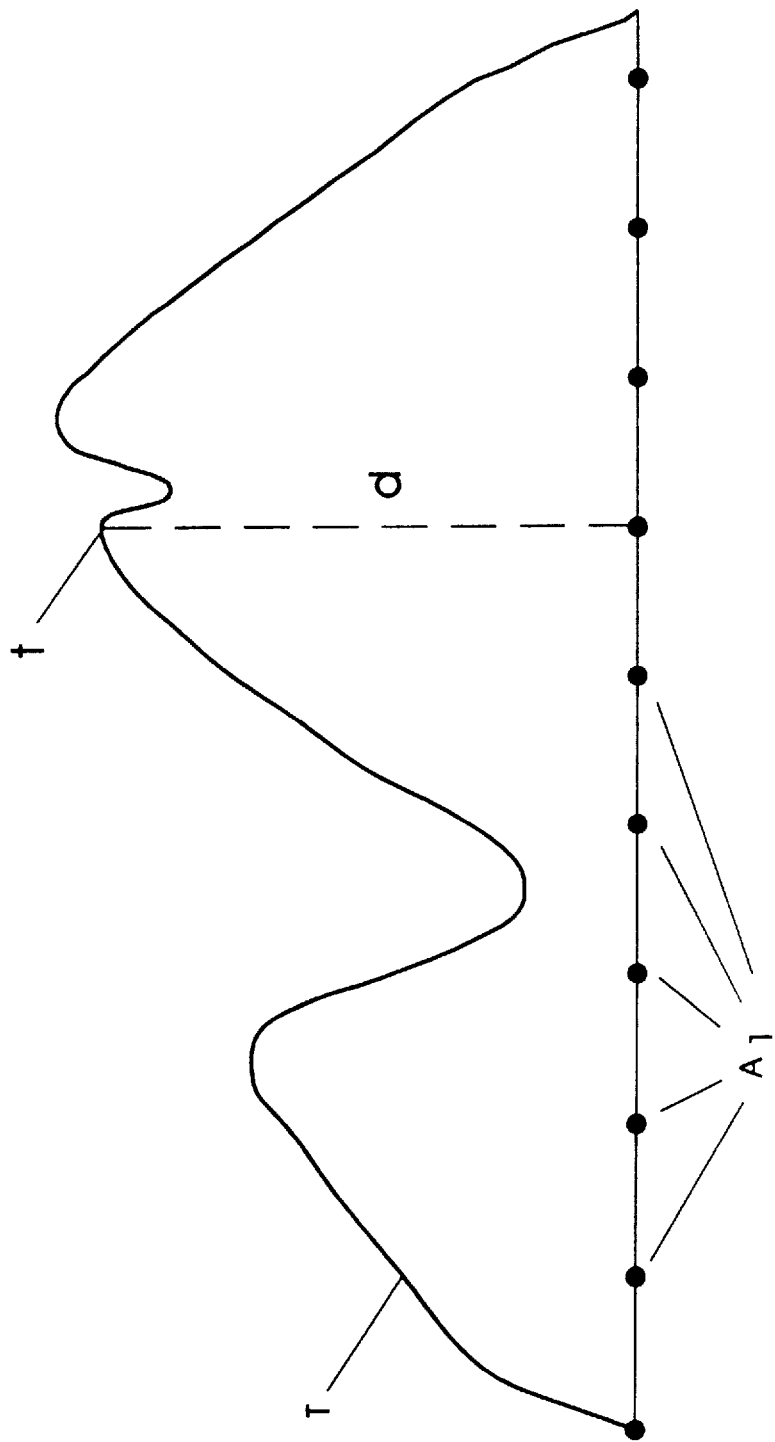

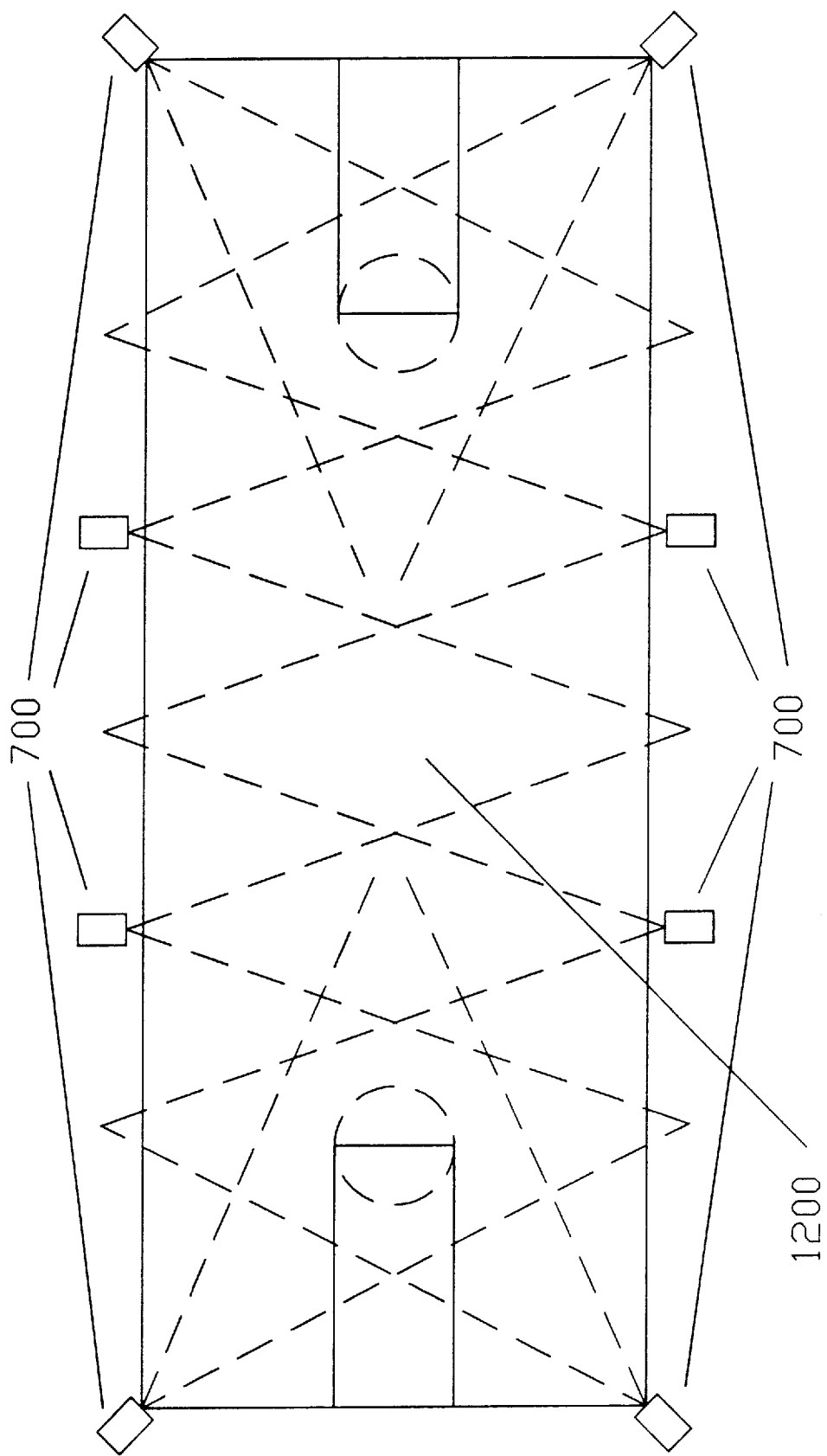

HIGH-SPEED THREE-DIMENSIONAL TEXTURE MAPPING SYSTEMS AND METHODS

FIELD OF THE INVENTION

This invention relates to computer-based graphical processing and more particularly to systems, methods and program products for mapping three-dimensional texture onto surfaces in computer-based graphical processing.

BACKGROUND OF THE INVENTION

Computer graphics applications often involve display of three-dimensional objects in a "world space" on a two-dimensional display device such as a Cathode Ray Tube (CRT). In addition to non-real-time applications such as computer-aided-drafting of mechanical structures, interactive computer graphics applications include time-based three-dimensional simulations such as those used for flight training, architectural visualization and other forms of "virtual reality." These simulations may be based on factual data, as in some flight simulations or architectural visualizations, or imaginary data, as in many video games. For these simulation applications, a major challenge is rapid and accurate representation of complex, irregular three-dimensional surfaces that are moving with respect to an observer. For example, in a flight simulation it may be desirable to show terrain translating and rotating with respect to a virtual pilot in a virtual cockpit.

Conventional techniques for mapping a three-dimensional surface for representation on a two-dimensional display generally break down along two lines, each motivated by different needs. For precision applications such as measurement, computer-guided machining and the like, a designer may attempt to build a near-exact representation of surface detail. In these types of applications, faithful reproduction of surface detail may be essential to produce an accurate end product, e.g., a precise wing contour, a precise measurement of interference between parts, and the like. These precision results are often obtained at a high cost because of the size of the database which must be maintained and the multiple, complex computations which may be involved in describing and displaying surfaces.

In contrast, many graphics applications are less concerned with accurate representation of surface details than with providing an appearance of surface structure to lend greater realism to a display without burdensome computational overhead. For instance, a graphics designer wishing to faithfully reproduce an orange is more concerned that the simulated orange appear pebbled than with maintaining the exact location of each pebble on the orange's skin as it is rotated and translated with respect to the observer. For these types of applications, mapping techniques such as texture, bump and displacement mapping may be more appropriate. These techniques usually entail much less data storage and computational overhead, since each location on the three-dimensional surface need be transformed in world space and stored.

Conventional techniques for detailed surface modeling include polygon mesh and parametric and quadric surface approximation, as described in the textbook entitled *Computer Graphics Principles and Practice,* Second Edition by J. Foley et al., Addison-Wesley Publishing Company, Inc., 1990, pages 471–529. A polygon mesh approximates a surface by modeling it as a combination of polygons connected at their various edges. An explicit representation of a polygon represents the polygon as a list of its vertex coordinates in world space. To avoid redundant storage and repetitive transformation and scan conversion, polygon meshes are often defined using vertex and edge pointers. Lists of vertices and edges are maintained, with each polygon pointing to the edges or vertices which define it. This representational technique tends to cut down on storage requirements and redundant clipping, transformation and scan conversion computations because the constituent polygons of the mesh are manipulated and displayed using their common edges instead of the individual polygons. However, complex polygon meshes represented in this fashion still may present demanding storage and computational burdens.

Parametric and quadric surface modeling techniques model three-dimensional surfaces in much the same way as polygon mesh techniques, modeling the surface as a combination of segments or subsurfaces. Instead of using the simple piecewise-linear approximation used in a polygon mesh, however, these techniques use higher order piecewise-polynomial curves and surfaces. For many applications these techniques provide more accurate surface detail while diminishing the number of points which must be stored to represent the surface. This increased accuracy is often at the cost of complex third or higher-order parametric computations, however.

Conventional techniques for geometrical transformation of the three-dimensional surfaces represented by any of these surface modeling techniques typically apply the transformation to each of the polygon vertices or parametric curve endpoints generated for the model. Many multiplies and trigonometric calculations thus may be required for each point. Even with redundancy-reducing techniques such as vertex and edge pointers, this process is computationally intensive for all but simple surfaces which can be represented by a relatively coarse mesh. Complex surfaces such as terrain generally require a finer distribution of data points to achieve a realistic appearance. Display of a three-dimensional surface represented by a detailed surface model may be equally demanding, as a large number of subsurfaces may have to be projected onto a viewing plane and scan-converted to produce an image. Even with fine detail, additional processing may be required to minimize visual separation effects such as Mach bending caused by using a polygon mesh or similar technique. High-speed interactive transformation and display of these models thus may require processing capabilities beyond those available on general purpose processors such as those used in personal computers.

For these reasons, detailed three-dimensional surface modeling generally has been limited to precision applications such as CAD/CAM or to complex military or commercial training simulations carried out using special-purpose graphics processing hardware or high-powered supercomputers. Many other interactive simulation applications do not employ detailed surface modeling because the computational and data storage overhead involved may preclude updating the display quickly enough to represent movements in real time. Realistic motion representation may require image update rates in excess of 15 Hz, placing heavy demands on a processor performing object translation, projection or scan conversion.

As an alternative to detailed surface modeling, texture, bump and displacement mapping techniques may efficiently provide the appearance of three-dimensional surface detail with less computational and storage overhead. Several of these techniques are described in Foley et al., *Computer Graphics Principles and Practice,* Second Edition, pages 741–45. These techniques model an object in world space using a coarse representation, typically polygonal. The coarse representation normally contains a smaller number of data points than would be contained in a detailed surface model, and thus translations and rotations of the object in world space may be more easily and quickly computed. Surface detail may then be mapped on the subsurfaces of the coarse representation.

In two-dimensional texture mapping, texture elements are mapped onto the surfaces of the polygons to provide color cues which suggest a surface structure. In bump-mapping, the appearance of surface detail is achieved without detailed surface modeling by perturbing the surface normal of the illumination model used to display the underlying surfaces of the coarse model, giving a "bumpy" surface appearance. In displacement mapping, the actual surface is displaced to provide a similar appearance. Each of these approaches may provide realistic representations of three-dimensional surfaces without detailed surface modeling and the associated overhead.

However, many interactive graphics applications require accurate representation of three-dimensional surface detail throughout translation and rotation of the represented objects. For instance, in a flight simulation application it is generally desirable to maintain spatial relationships between such surface details as mountains and river valleys. Furthermore, certain interactive applications may require accurate surface data in order to provide realistic interaction. For instance, an application may need to accurately simulate such things as ordnance delivery, "walk throughs", object location and the like. Texture, bump and displacement mapping techniques generally do not provide accurate surface information for such simulations.

In conclusion, neither conventional detailed surface modeling nor conventional two-dimensional texture mapping and bump-mapping generally provide the combination of computational efficiency and three-dimensional surface detail desired for interactive graphics applications such as virtual reality simulation. Moreover, the growing demand to provide these types of applications on low-cost processing platforms such as personal computers intensifies the need for efficient systems and methods of three-dimensional surface mapping. Although these machines increasingly have greater data storage and computational capabilities, increasingly complex and detailed simulations will continue to create a need for more accurate and efficient manipulation and display of three-dimensional surfaces.

SUMMARY OF THE INVENTION

In view of the foregoing, it is an object of the present invention to provide improved systems, methods and program products for mapping a three-dimensional texture onto a displayed surface.

It is another object of the present invention to provide improved systems, methods, and program products for mapping a three-dimensional texture onto a displayed surface that provide realistic and accurate representation of texture detail.

It is another object of the present invention to provide systems, methods and program products for mapping a three-dimensional texture onto a displayed surface that provide a realistic and accurate representation of movement of the displayed surface with respect to an observation location.

It is another object of the present invention to provide systems, methods and program products for mapping three-dimensional texture onto a displayed surface that may be used with personal computers and other relatively low cost systems.

These and other objects are provided in systems, methods and program products which map a three-dimensional texture onto a graphically-displayed surface by interpolating a location for the texture using a previously stored distance relationship between the surface, the three-dimensional texture, and a reference location which is spaced a reference distance from the surface. The surface preferably is represented by a uniform grid of points, to provide for simplified incremental computations for moving the surface. The reference location similarly may include a uniform grid of points, or may include a single point. As will be understood by those skilled in the art, high-speed mapping of the three-dimensional texture may be thus be achieved using simplified computations involving simple additions and a minimized number of multiplications, instead of the several multiplications and trigonometric computations which may be required for a three-dimensional geometrical transformation of each location of the three-dimensional texture.

The present invention can thus provide fast, accurate and realistic representation of three-dimensional texture on a surface, retaining information on fine surface detail while performing less complex, and hence more efficient, movements of associated simplified surfaces. The present invention can also allow for real-time simulation of the motion of surfaces having three-dimensional texture while maintaining accurate spatial relationships among surface details. In addition, the present invention provides systems, methods and program products for mapping three-dimensional texture onto surfaces which may be used on low-cost, general-purpose processors such as those used in personal computers.

In particular, systems, methods and program products for mapping a three-dimensional texture onto a surface which is graphically displayed according to the present invention, store a first array of points representing the three-dimensional surface, each point having an associated element of the three-dimensional texture and a distance to the element. In response to a command to move the surface according to a predetermined transformation, a new location for each point in the first array is computed to obtain a second array of points representing the surface, moved according to the predetermined transformation. A location for each element of the three-dimensional texture associated with each point of the first array is interpolated from the corresponding point in the second array and a reference location spaced a reference distance apart from the surface.

The reference location may include a single reference point or an array of reference points corresponding to the first array of points. The distance stored for each point representing the surface may include a distance from the three-dimensional texture to the point and a distance from the three-dimensional texture to the corresponding reference location. For instance, the first array may include a grid of points having associated terrain elevations for associated terrain features, such as provided by terrain maps supplied by the United States Geologic Survey (USGS) or the Defense Mapping Agency (DMA). The reference location may include a planar reference grid of points lying parallel to the map grid and spaced a reference distance apart from the map grid equivalent to the highest elevation in the mapped section.

The present invention also preferably renders the surface having three-dimensional texture by graphically displaying the interpolated locations for the three-dimensional texture. Preferably, rendering is achieved using perspective mapping and other graphic display elements commonly utilized in computer graphics systems. The storing operation of the present invention may include storing a visual characteristic associated with each element of the three-dimensional texture, such as color, brightness and luminance, for use in rendering the location of the three-dimensional texture. Rendering may include color or other visual characteristic interpolation which provide for a realistic rendered surface.

The present invention may also generate the first array of points representing the surface. A camera or plurality of cameras which obtain distance measurements may record image points and associated distances for the first array of points. For example, a camera may be combined with laser rangefinding means to produce an image with associated distance information. The reference location associated with the first array may coincide with a focal point for the distance measurements. Detailed representations of the three-dimensional textures of surfaces in scenes such as landscapes, building interiors and sporting events may thus be obtained, which may be mapped according to the present invention to provide rapid, accurate and realistic representation of perspective changes and movements of the surfaces in the scene.

Those skilled in the art will understand that the present invention may be also be regarded as providing systems, methods and program products which map a three-dimensional surface for graphical display by mapping the surface as a relative location between two other surfaces. An array having a plurality of elements is stored, each element of the array having a point of the three-dimensional surface associated therewith. First and second reference locations are identified for each element of the array, representing projections of the associated point on the three-dimensional surface upon a first reference surface and a second reference surface spaced a reference distance apart from the first reference surface, respectively. A corresponding distance representing the relative location of each point of the three-dimensional surface with respect to the corresponding first and second reference locations is also identified for each element of the array.

In response to a command to move the three-dimensional surface according to a predetermined transformation, the transformation is applied to the first and second reference locations corresponding to each element of the array to obtain new first and second reference locations for each point. The new first and second reference locations represent the first and second reference surfaces moved according to the predetermined transformation, respectively. A new location for each point of the three-dimensional surface associated with each element of the array is interpolated from the corresponding new first reference and new second reference locations. Fast, accurate and realistic three-dimensional texture mapping is thereby provided.

BRIEF DESCRIPTION OF THE DRAWINGS

FIG. 5 illustrates three-dimensional texture mapping for a moved surface according to the present invention for a simplified two-dimensional case.

FIG. 7 illustrates a camera with an associated laser rangefinder for generating distance measurements associated with points of an image according to the present invention.

FIG. 9 illustrates generation of heights for a three-dimensional texture to be mapped onto surface for a terrain-mapping application according to the present invention.

FIG. 12 illustrates camera placements for application of the present invention to create virtual perspectives of a sporting event.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Three-Dimensional Texture Mapping—General Overview

Figure 13:
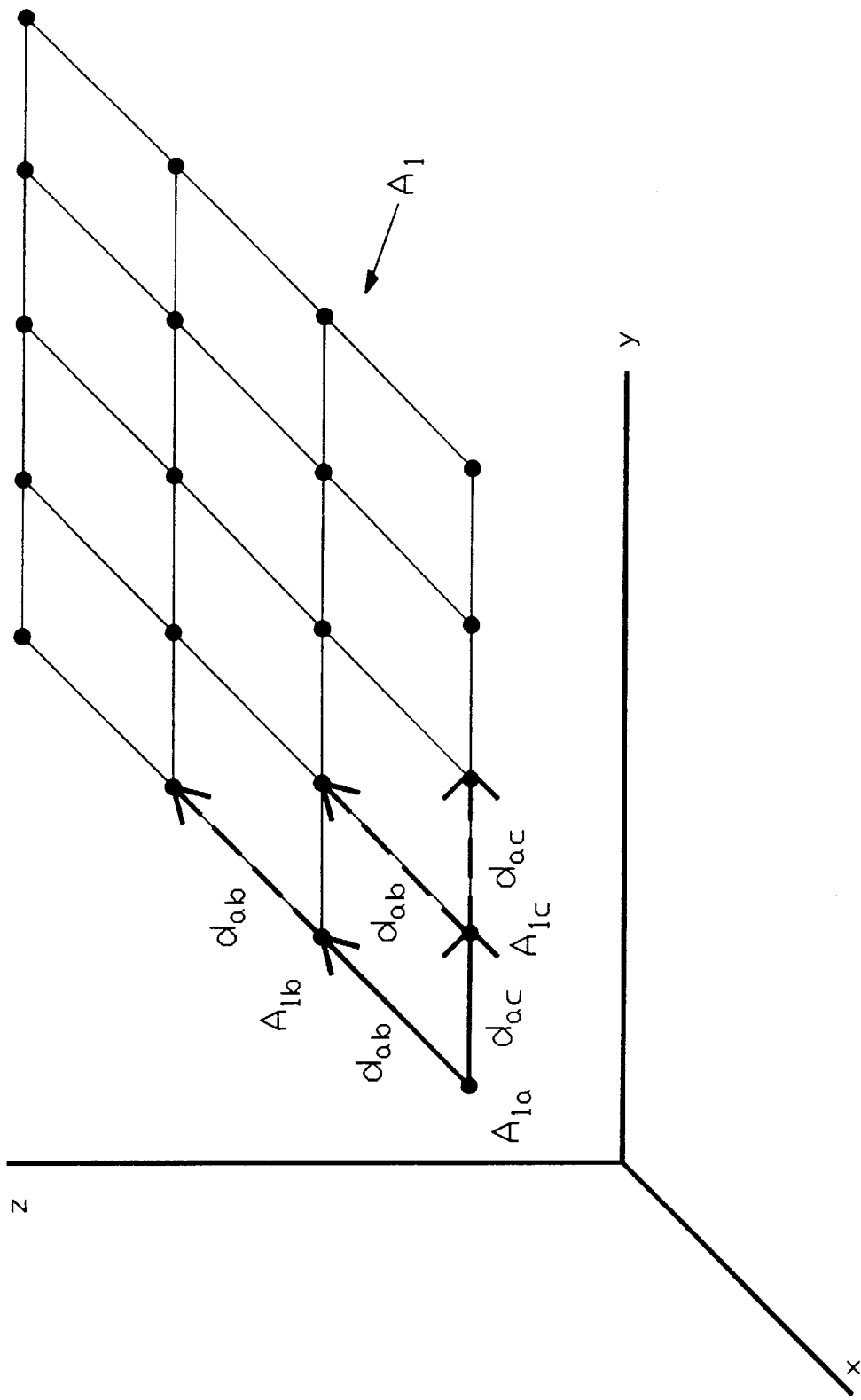
FIG. 13 illustrates incremental relationships in a uniform array of points representing a surface according to the present invention.

As will be understood by those skilled in the art, three points are required to define a plane in three-dimensional space. For a uniform planar array of points representing a surface in three-dimensional space, a transformation of the array may be achieved by the transformation of a set of three points which establish the relationship between points of the array, followed by a series of computations from these points. For example, as illustrated in FIG. 13, a uniform planar array $A_1$ may be defined by the points $A_{1a}$, $A_{1b}$, and $A_{1c}$. Once these points are established, the remaining points in the array $A_1$ may be computed according to a linear mapping, i.e., by computing a pair of relative three-dimensional displacements $d_{ab}$ and $d_{ac}$ among the points $A_{1a}$, $A_{1b}$, and $A_{1c}$, and adding the appropriate displacements to the already located points to compute locations for adjacent points. Once these adjacent points are computed, points adjacent to them may be similarly computed.

Those skilled in the art will understand that this incremental process generally may be implemented without a large number of complex and time-consuming trigonometric and multiplication operations. The transformation of a uniform grid may be accomplished with a minimum of three general coordinate transformations, followed by a computation of two relative displacements and a series of additions. For example, for the grid illustrated in FIG. 13, after the locations for $A_{11}$, $A_{12}$, and $A_{13}$, and the relative displacements $d_{ab}$ and $d_{ac}$ are computed, the remaining seventeen points of the grid $A_1$ may be computed by performing 17×3=51 additions. Generally, additions such as these can be quickly performed by low-cost general purpose processors.

The present invention takes advantage of this technique for transforming simple surfaces to quickly map a three-dimensional texture onto a surface. As will be understood by those skilled in the art, the geometrical transformation of every point of a three-dimensional texture is extremely time-consuming and expensive. However, transformation of the texture may be more quickly achieved if elements of the texture are mapped onto a simpler, preferably planar, surface represented by a uniform array of points. The array representing the simple surface may first be transformed using the computations described above. Then, using a distance associated with each element of the texture locating the element with respect to a point in the uniform array, a location for each element of the texture may be interpolated from the location of the corresponding point of the array, without resort to a generalized three-dimensional transformation for each point of the texture.

Figure 6A:
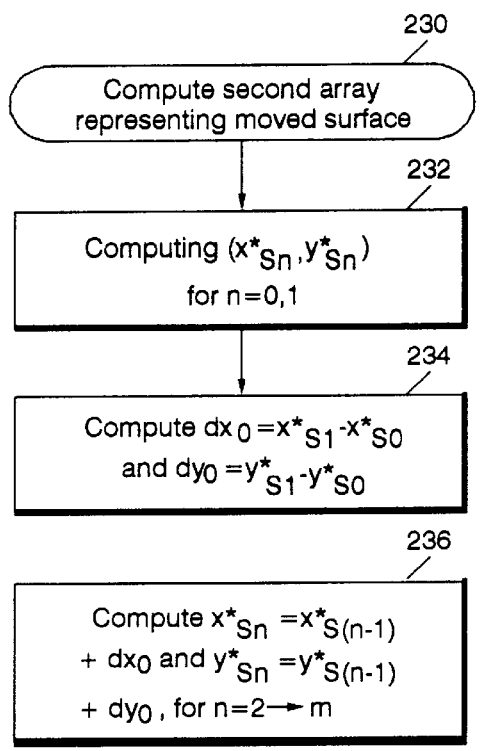
FIG. 6A is a flow chart illustrating operations for computing locations for a surface according to the present invention for a simplified two-dimensional case.
Figure 6B:
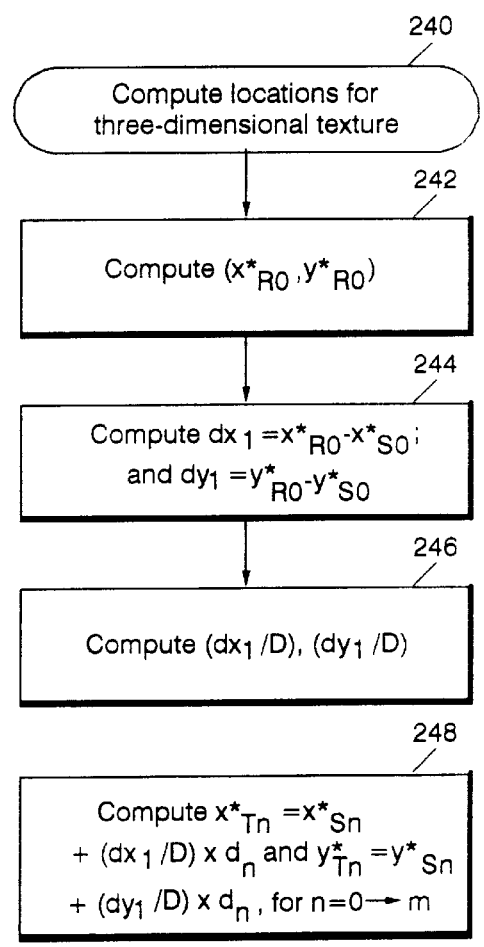
FIG. 6B is a flow chart illustrating operations for computing locations for elements of a three-dimensional texture according to the present invention for a simplified two-dimensional case.

FIGS. 6A and 6B illustrate this concept for a simplified two-dimensional mapping, i.e., with z=0, of a "three-dimensional" texture T onto a surface S represented by a uniform first array of points ($x_{Sn}$, $y_{Sn}$). An element of the texture T is associated with a point in the array, along with a distance $d_n$ between the element and the point in the array along a line from the surface S (in this case, actually a line) to a reference surface R (also a line) spaced parallel to and a reference distance D apart from surface S.

To move the surface S by an angle θ, the operations illustrated in FIG. 6A (Block 230) are performed. New locations for two points ($x_{S0}$, $y_{S0}$), ($x_{S1}$, $y_{S1}$) are computed (Block 232) to obtain corresponding points ($x_{S0}^*$, $y_{S0}^*$), ($x_{S1}^*$, $y_{S1}^*$) in a second array representing the surface S moved by the angle θ. It will be understood by those skilled in the art that the computation of locations for these points may typically may be performed using generalized coordinate transformation operators. A first relative displacement ($dx_0$, $dy_0$) is computed (Block 234) between the points ($x_{S0}^*$, $y_{S0}^*$), ($x_{S1}^*$, $y_{S1}^*$) of the second array representing the moved surface S. Using the first relative displacement ($dx_0$, $dy_0$), the remaining points in the array ($x_{Sn}^*$, $y_{Sn}^*$) are then computed (Block 236), by adding the displacement to an already computed point ($x_{Sn}^*$, $y_{Sn}^*$) of the array to obtain an adjacent point ($x_{Sn+1}^*$, $y_{Sn+1}^*$) of the array.

To interpolate locations for elements of the three-dimensional texture T, the operations (Block 240) of FIG. 6B are performed. A point in a third array ($x_{R0}^*$, $y_{R0}^*$) representing a reference location corresponding to the point ($x_{S0}$, $y_{S0}$) is computed (Block 242). A second relative displacement ($dx_1$, $dy_1$) is computed (Block 244) between the computed point ($x_{S0}^*$, $y_{S0}^*$) of the second array and the computed point ($x_{R0}^*$, $y_{R0}^*$) of the third array. Next, a displacement ($dx_1/D$, $dy_0/D$) is computed (Block 246), representing the proportional for placing the associated texture T for the points of the moved surface S. Finally, locations for elements of the texture T are computed (Block 248), in an iterative series of computations involving only one multiplication and one addition.

Figure 14:
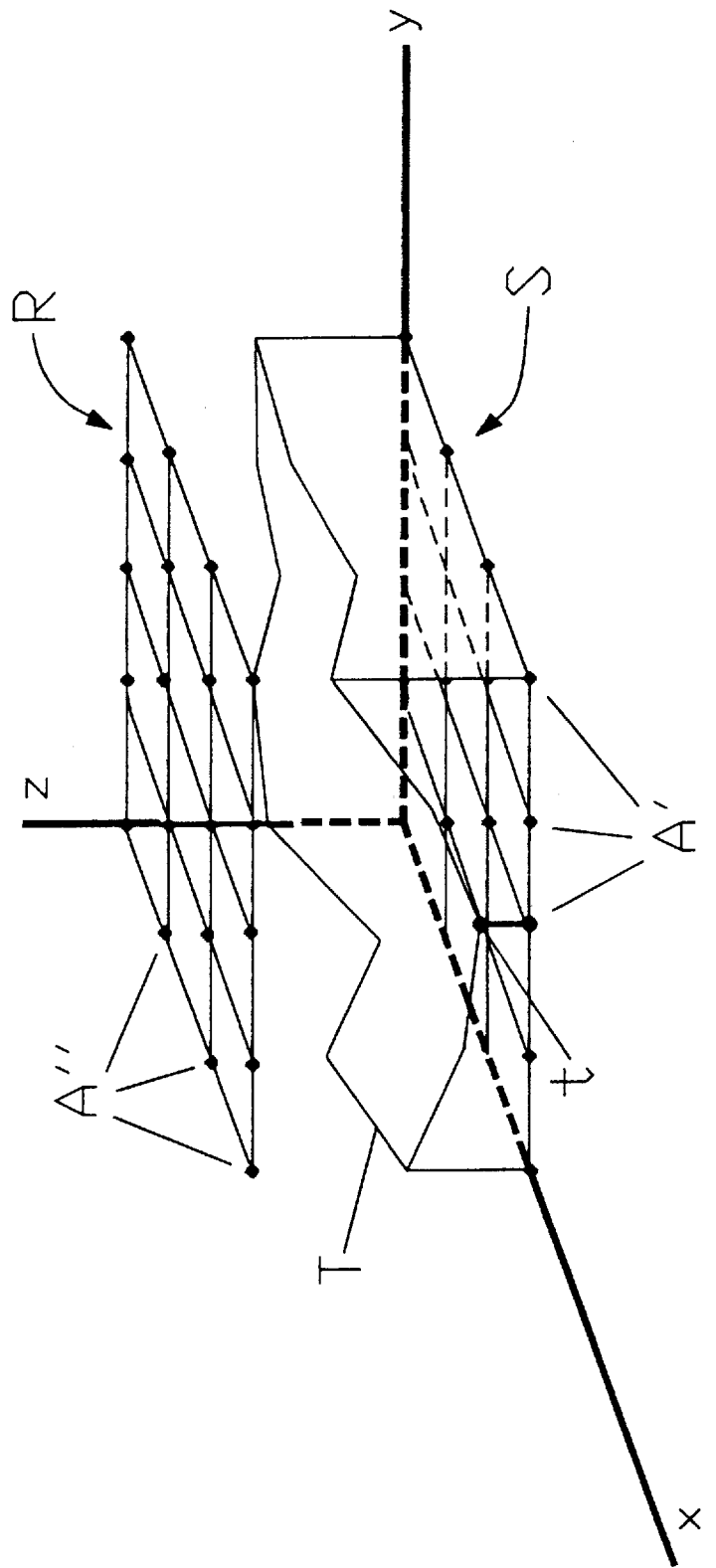
FIG. 14 illustrates elements of a three-dimensional texture located with respect to a pair of grids according to the present invention.

Extending this concept to three dimensions, a complex three-dimensional texture may be represented using a "grid sandwich," as illustrated in FIG. 14. As will be understood by those having skill in the art, elements t of a texture T located between the arrays A' and A" representing the surfaces S and R, respectively, retain the same relationship to the bounding surfaces regardless of the orientation of the sandwich, much as cards in a deck retain the same relative orientation no matter how the deck is oriented. Because of this, the elements t may be defined by their proportional placement between the surfaces S and R. Transformation of the texture T may thus be achieved by first transforming the arrays A' and A" using the incremental techniques outlined above, and then interpolating the locations for the associated elements t of the texture T, based on the proportional placement.

Those having skill in the art will understand that three-dimensional texture mapping according to the present invention is not limited to sandwiching a texture between a pair of uniform planar grids. A single grid with an associated point reference might also be used, as discussed below. The texture T may be located outside of a defining grid sandwich in other applications. In some applications, non-planar grids may be preferred.

Three-Dimensional Texture Mapping—Detailed Description

A preferred embodiment of the invention may be implemented in a computer program which runs on a standard personal computer, such as a Power-PC system. This system will only be briefly described, because it is well known to those having skill in the art. Similarly, the invention utilizes, in part, many known graphics techniques for defining objects and for generating a graphics display. These techniques will also not be described in detail herein. Rather, the description will concentrate on methods and systems for high-speed three-dimensional texture mapping according to the present invention.

Figure 1:
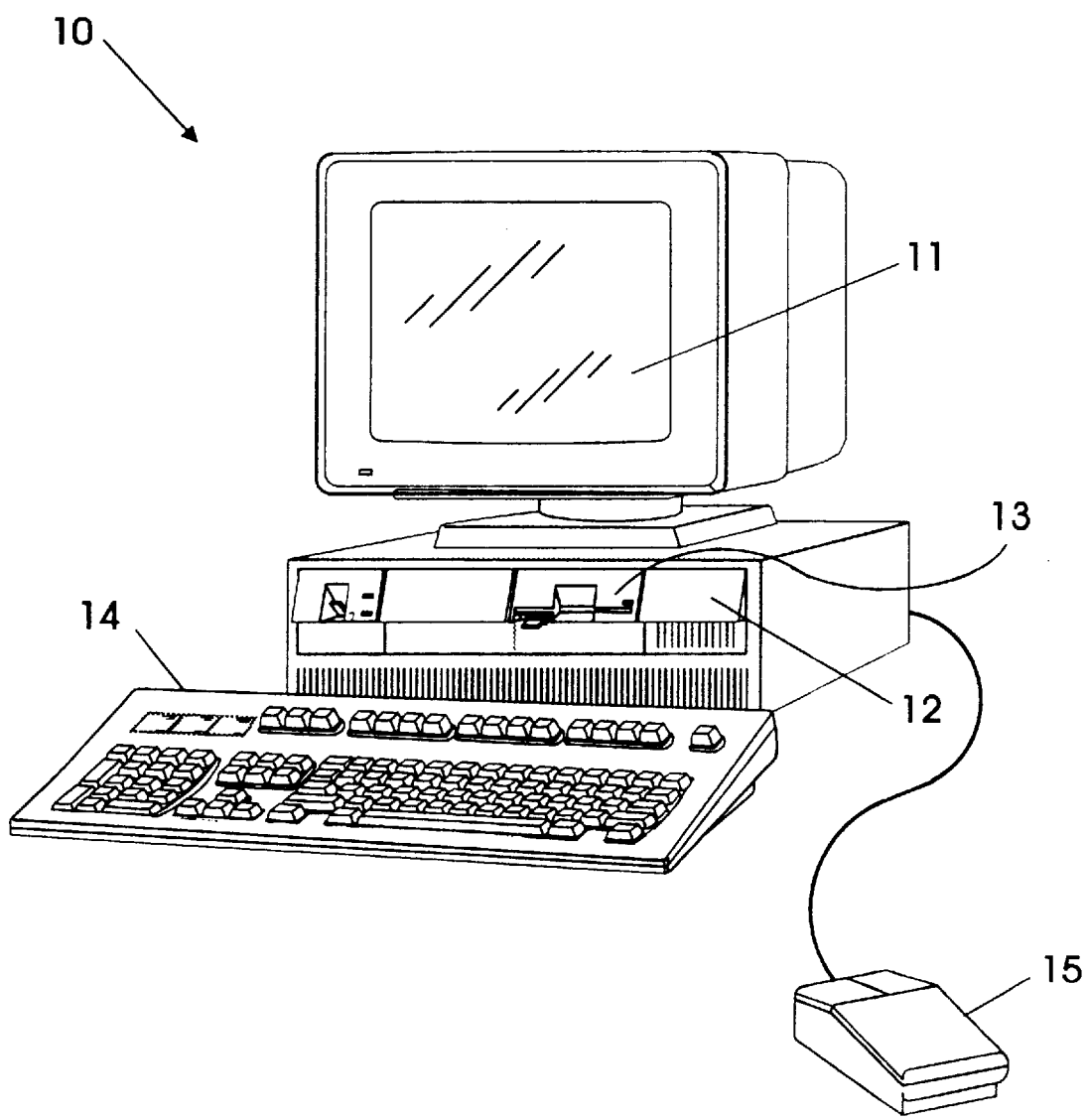
FIG. 1 illustrates a computer system on which the present invention may be practiced.

Referring to FIG. 1, the graphical display system 10 preferably includes a two-dimensional graphical display (also referred to as a "screen") 11, preferably a high-resolution color graphics display, and a central processing unit 12. The central processing unit contains a microprocessor (not shown) and random access memory (not shown) for storing programs therein for processing by the microprocessor. A disk drive 13 for loading programs may also be provided. A keyboard 14 having a plurality of keys thereon is connected to the central processing unit 12, and a pointing device such as a mouse 15 is also connected to the central processing unit 12. It will also be understood by those having skill in the art that one or more (including all) of the elements/steps of the present invention may be implemented using software executing on a general purpose graphical display system, using special purpose hardware-based graphical display systems, or using combinations of special purpose hardware and software.

FIGS. 2–4 and 6A–6B are flowchart illustrations of methods, apparatus (systems) and program products according to the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Figure 2:
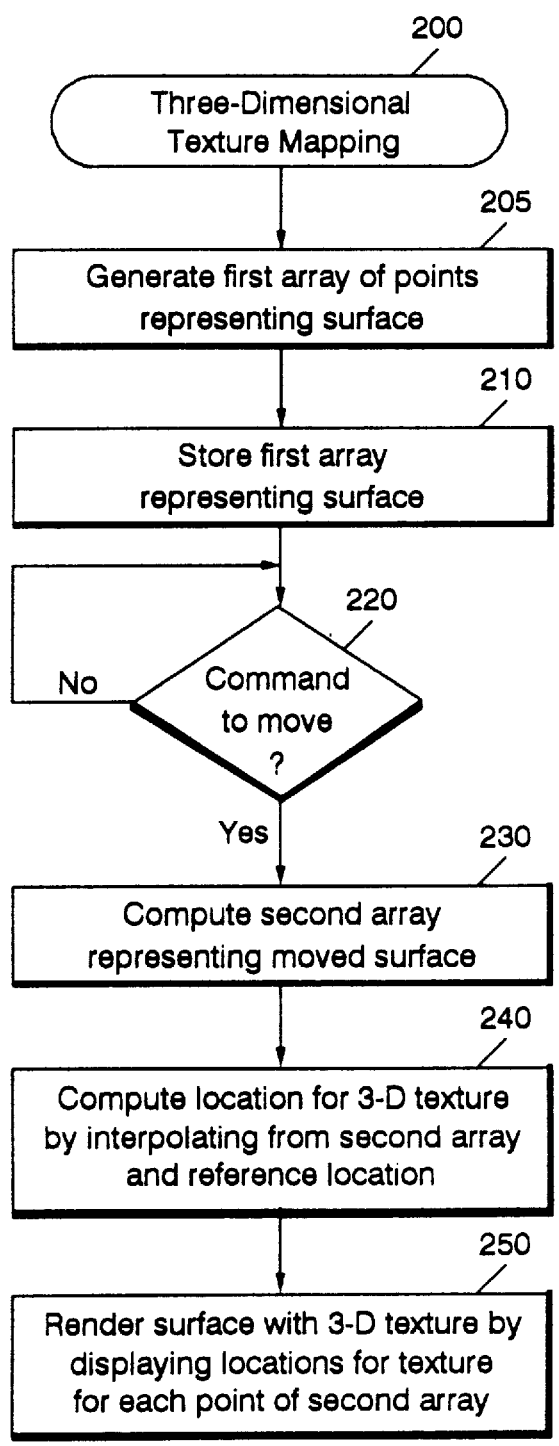
FIG. 2 is a flow chart illustrating operations for three-dimensional texture mapping according to the present invention.

Referring now to FIG. 2, a flowchart illustration of three-dimensional texture mapping (Block 200) according to the present invention is shown. A first array of points is stored (Block 210), representing the graphically displayed surface. Associated with each of the points of the first array is at least one element of the three-dimensional texture to be mapped on the surface and a texture distance to the element of the texture. Upon a command to move the surface (Block 220), a second array of points representing the moved surface is computed (Block 230). After new locations for the points of the first array are calculated to obtain a second array representing the surface S moved as commanded, locations for texture elements associated with each point of the first array are computed (Block 240) by interpolating from the points of the second array.

Preferably, the surface represented by the first array is a two-dimensional planar surface. It will be understood by those skilled in the art that non-planar surfaces may also be used with the present invention, however, such as spherical or ellipsoidal surfaces. Preferably, the first array of points includes points having a regularized relationship which allows simplified computation procedures to be employed when new locations are to be computed for the points of the first array.

Figure 8A:
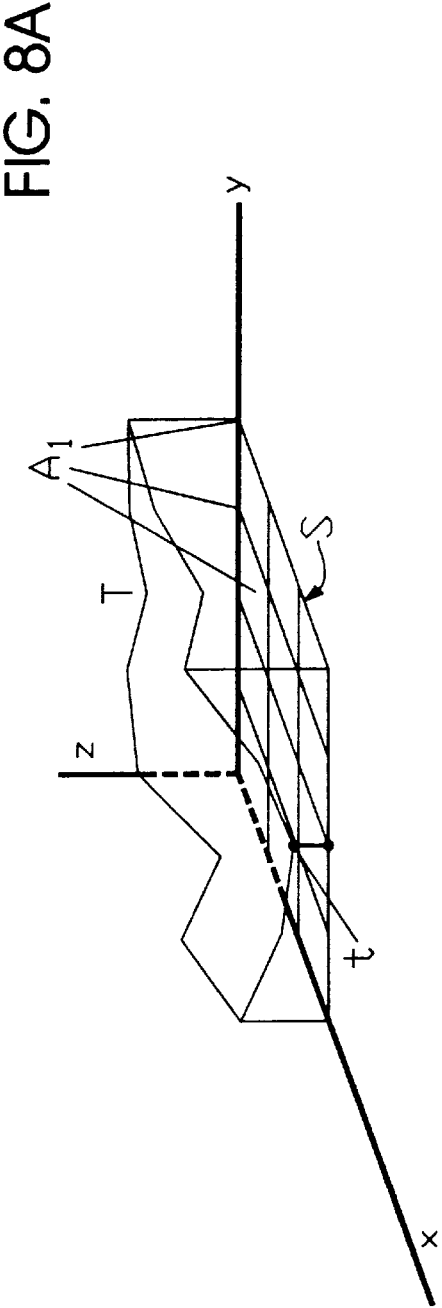
FIGS. 8A–8B illustrate relating a three-dimensional texture to a uniform grid of points representing a surface and a corresponding grid of points representing a parallel reference surface according to the present invention.

An example of such a surface is illustrated in FIG. 8A, where surface S is represented a rectangular array of points $A_1$. The texture distance d may represent the height of the texture element above the surface S. For instance, where the surface is represented by a two-dimensional rectangular grid located at sea level, such as is often employed in terrain maps, the associated texture distance d may include the elevation, i.e., the distance from points of the grid located along a normal to the surface, to overlying terrain features, as illustrated in FIG. 9.

Figure 3:
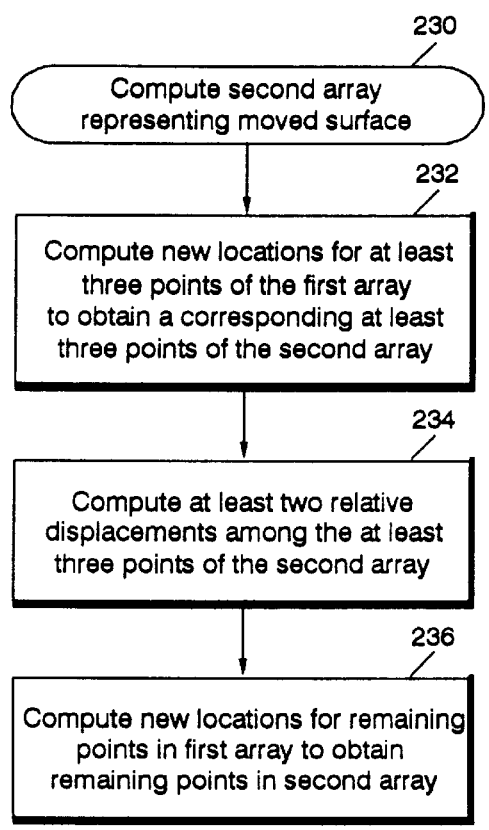
FIG. 3 is a flow chart illustrating operations for computing new locations for an array representing a graphically-displayed surface according to the present invention.

Detailed operations for computing new locations for the first array to obtain a second array representing the moved surface are illustrated in FIG. 3 (Block 230). For a surface represented by a uniform two-dimensional grid, generalized three-dimensional transformations need only be applied to compute locations for three points of a uniform two-dimensional grid representing the surface S in order to compute (Block 232) points of the second array representing the moved surface S. After locations are computed for these three points, two relative three-dimensional displacements are computed (Block 234) among the points. Using these relative three-dimensional displacements, the locations of the remaining points of the second array may be computed (Block 236).

It will be understood by those skilled in the art that interpolation involves the computation of the value of one function for an argument using a different function of the same argument. According to the present invention, instead of applying complex generalized transformations to points representing the x-y-z locations of the three-dimensional texture, locations for the elements of the three-dimensional texture associated with each point of the first array are preferably obtained by computing these locations based on the proportional placement of the element with respect to the surface. This proportional placement may be defined by a relationship between the texture distance associated with the element and a reference distance to a reference location spaced apart from the surface.

Figure 4:
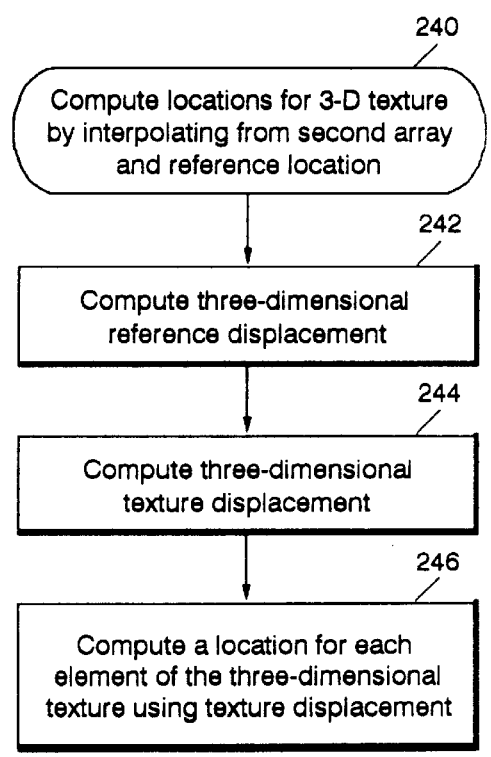
FIG. 4 is a flow chart illustrating operations for computing locations for elements of a three-dimensional texture according to the present invention.
Figure 8B:
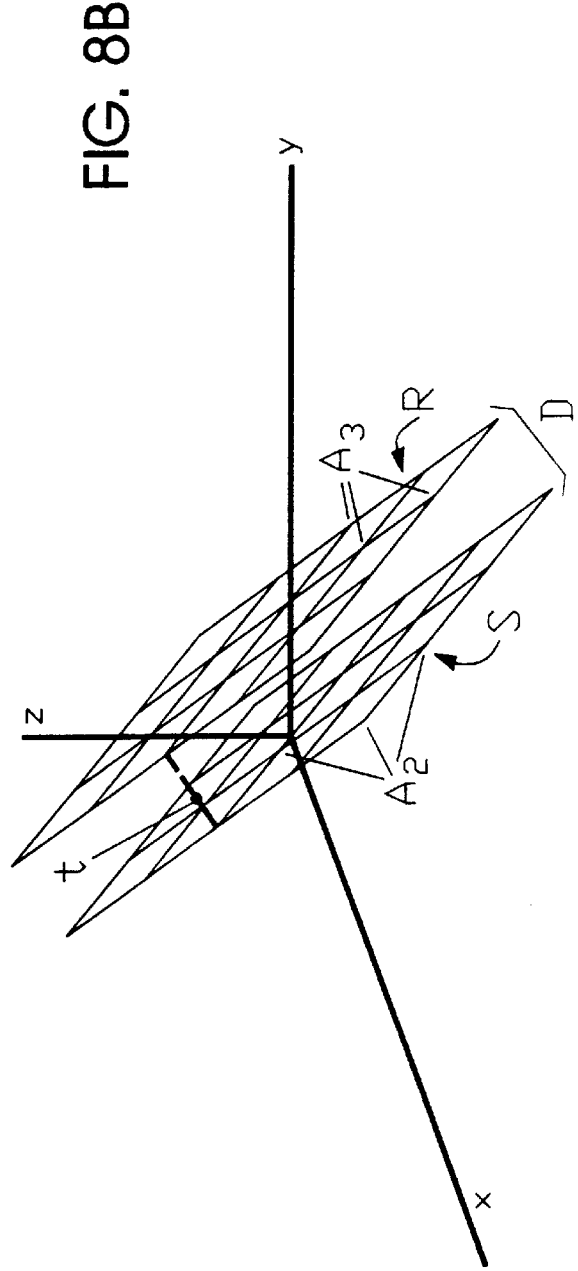

As illustrated in FIG. 8B, the reference location preferably is a reference surface R which is represented by a third array of points $A_3$, each of which correspond to points in the second array of points $A_2$ representing the moved surface S. As illustrated in FIG. 4, for such a reference location, locations for elements of the three-dimensional texture may be interpolated (Block 240) from the location of points of the second array. A three-dimensional reference displacement is computed (Block 242) between a point in the second array representing the surface S and the corresponding point in the third array representing the reference surface R. From this reference displacement, a three-dimensional texture displacement is computed (Block 244) for each element of the texture associated with the first array from the reference displacement, the reference distance D and the texture distance $d_n$ associated with the element:

$$dx_{Tn} = \frac{dx_R \times d_n}{D};$$

$$dy_{Tn} = \frac{dy_R \times d_n}{D};$$

and $$dz_{Tn} = \frac{dz_R \times d_n}{D}.$$

The location for the element is computed (Block 246) from the texture displacement and the corresponding point in the second array. Preferably, the location is computed by adding the computed texture displacement to the location of the corresponding point in the second array.

Figure 10:
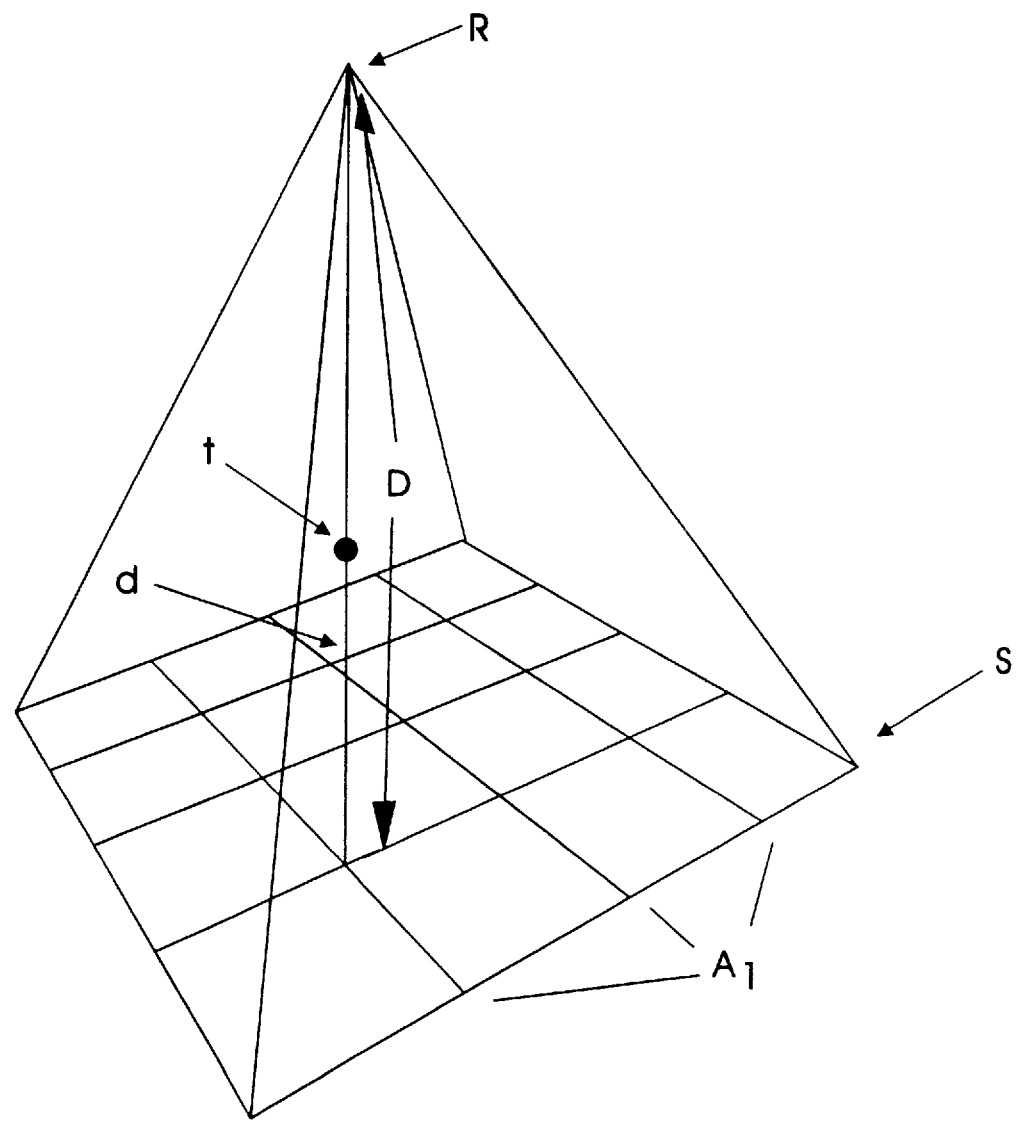
FIG. 10 illustrates generation of distances using a single point reference according to the present invention.

Those skilled in the art will understand that other distances may be employed with the present invention. For example, the texture distance d associated with the texture element t may include a distance from a point in a surface grid to the element, along a line to a reference location R which is not normal to the surface, as illustrated in FIG. 10. The distance illustrated in FIG. 10 may, for example, be particularly suited for applications where the first array of points representing the surface is generated by a single camera capable of making distance measurements for each point of an image, as discussed below. For such an embodiment, the reference location R may coincide with the focal point for the camera. The texture distance d may represent the distance from the surface S as shown, or more appropriately for the camera described above, the distance from the camera focal point at R to the texture element t.

It will be understood by those skilled in the art that the texture distance may be normalized with respect to the reference distance between the surface S and the reference location R. In addition, the reference distance may coincide with a texture distance associated with one of the points of the array representing the surface S. In a terrain mapping application, for example, the reference distance may represent the highest elevation in the terrain mapped to the array representing the surface S, and the remaining texture distances may be normalized with respect to this highest elevation.

Computation of locations for elements of the three-dimensional texture may be further streamlined. For example, a common factor in computing the texture displacement along each direction x, y and z, is the ratio between the reference displacement to the reference distance, the scaled displacement $\{dx_R/D, dy_R/D, dz_R/D\}$. After the points of the second array are computed, this scaled displacement may be computed before computing the locations for the elements of the three-dimensional texture. Thus, the calculation of the texture displacement can be reduced to a single multiply, which may itself be expedited by the use of techniques such as lookup tables, which may be more quickly executed in general-purpose processors lacking high-speed hardware multipliers.

As illustrated in FIG. 2, the computation of locations for the elements of the three-dimensional texture may be followed by the rendering (Block 250) of the three-dimensional texture mapped onto the surface S. Preferably, the rendering is performed using a perspective mapping for each element of the three-dimensional texture T associated with each point of the array representing the surface S.

Figure 11A:
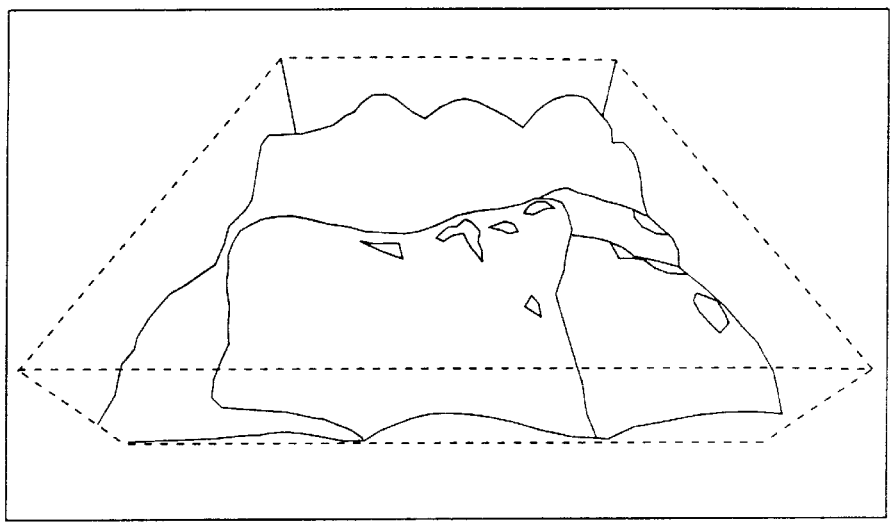
FIGS. 11A–11C illustrate three-dimensional texture mapping with rendering of associated visual characteristics according to the present invention.
Figure 11B:
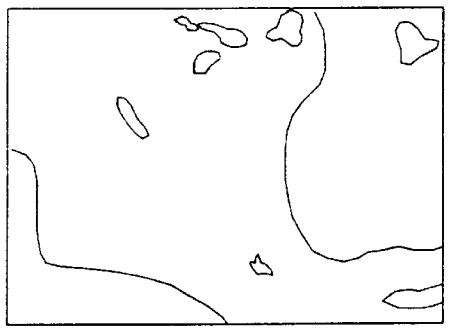

In addition to a texture distance, a visual characteristic may be associated with each element of the three-dimensional texture associated with each point in the first array. For example, each element of a three-dimensional texture such as the texture T illustrated in FIG. 11A, may have a associated color, as illustrated in FIG. 11B. The surface S with the mapped texture T may be rendered on a graphical display using the associated color value, as in FIG. 11C. Other visual characteristics, such as brightness or luminance, may also be associated with elements of the three-dimensional texture T.

Further improvements in speed and memory utilization may also be gained by using data structures which interleave texture distance and visual characteristics. For example, three bytes representing blue, green and red color data for an element of the three-dimensional texture may be combined with a fourth byte representing the associated texture distance, the combination forming a single 32-bit word. Using such a combined data structure, the texture distances and visual characteristics for a scene may be stored in a single map of 32-bit words.

Figure 11C:
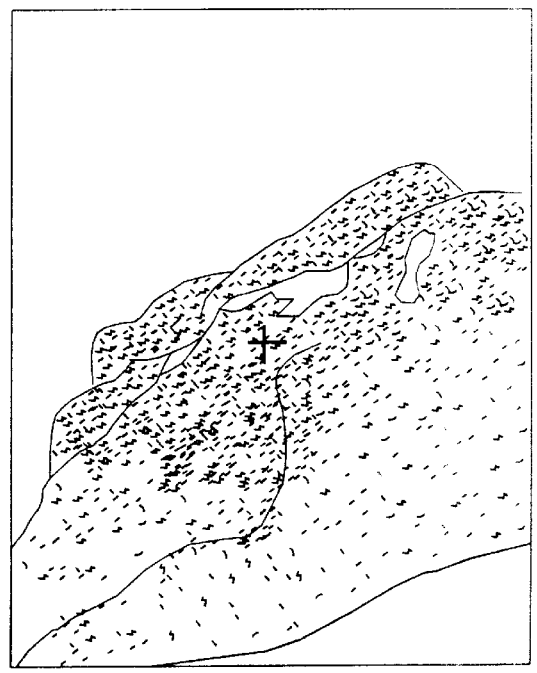

For some perspectives, pixels representing elements of the three-dimensional texture may tend to cluster on the screen, yielding a sparse image as illustrated in FIG. 11C. It will be understood by those skilled in the art that the sparse image may be improved by use of graphics interpolation techniques such as Gourard shading.

As also illustrated in FIG. 2, the storing of the first array of points representing the surface S may be preceded by the generation (Block 205) of the points and associated texture distance, visual characteristic, and the like. The array may be generated from an image of a surface S with an associated texture T photographed with a camera which also obtains distance measurements. For example, referring to FIG. 7, a camera 710 may be coupled to a laser rangefinder 720 operating through a common line of sight 728. The laser may be registered with the line of sight of the camera by using a half-silvered mirror 724 which allows light to be transmitted to the camera while reflecting an incident laser beam. An example of such a combined camera/laser rangefinder is described in U.S. Pat. No. 5,283,640 to Tilton. As an alternative to laser rangefinding, multiple cameras located at differing positions may be employed to obtain multiple offset images of a three-dimensional texture, from which depth information may be extracted using pixel-matching techniques and triangulation based on the respective locations of the cameras.

Applications of Three-Dimensional Texture Mapping

An example of the application of three-dimensional texture mapping according to the present invention is in terrain and flight simulation. A new class of flight simulators may be developed where imagery is based upon real photographs and satellite images of terrain. Because the present invention can orient an image of terrain, flight paths of projectiles, airplanes and the like may be less restricted than with conventional technologies, leading to a more realistic simulation.

Given the appropriate real-time acquisition of image and depth/height data with a photographic system as described above, other applications involving real-time imaging of three-dimensional textures of surfaces displayed on a graphical display such as a television or computer monitor may be developed using the present invention. As illustrated in FIG. 12, multiple rangefinding cameras 700 may be positioned at events such as a basketball game, gathering image and range data which may be quickly processed to create virtual perspectives which take the viewer "into" the game. Given an appropriate broadband communications system, a viewer could pick desired perspectives interactively. In other virtual reality applications, computer generated imagery may be combined with real range/image data to create mixed images with three-dimensional texture. For example, real photographic landscape data could be used as background for virtual dinosaurs and other extinct or mythical creatures.

Other applications are also possible. For example, the present invention could be used for a form of three-dimensional "sculpting." An artist could use a three-dimensional brush to "pull" a three-dimensional texture out of a virtual canvas. Similar techniques could be used to sculpt three-dimensional "statues" from two-dimensional portraits of people, animals and the like.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of mapping a three-dimensional texture onto a surface which is displayed on a graphical display, comprising the steps of:

storing a first array of points representing the surface, each point of the first array having an element of the three-dimensional texture and a texture distance which locates the element with respect to the surface, associated therewith;

in response to a command to move the surface, computing a new location for each point in the first array to obtain a corresponding second array representing the moved surface;

for each point in the first array, computing a three-dimensional reference displacement between the corresponding point of the second array and a reference location spaced a reference distance apart from the point;

computing a scaled three-dimensional reference displacement for each point of the first array by dividing the corresponding three-dimensional reference displacement by the corresponding reference distance;

computing a three-dimensional texture displacement for each element of the three-dimensional texture associated with each point of the first array by multiplying the corresponding scaled three-dimensional reference displacement by the texture distance associated with the element; and computing a location for each element of the three-dimensional texture associated with each point in the first array by adding the corresponding texture displacement to the location of the corresponding point in the second array.

2. A method according to claim 1 wherein the step of computing a scaled three-dimensional reference displacement for each point of the first array comprises reading the scaled three-dimensional reference displacement from a multiplication lookup table based on the three-dimensional reference displacement and the corresponding reference distance.

3. A method according to claim 1 wherein the step of computing a three-dimensional texture displacement comprises reading the three-dimensional texture displacement from a multiplication lookup table based on the scaled three-dimensional reference displacement and the associated texture distance.

4. A method of mapping a three-dimensional texture onto a surface which is displayed on a graphical display, comprising the steps of:

storing a first array of points representing the surface, each point of the first array having an element of the three-dimensional texture and a texture distance which locates the element with respect to the surface, associated therewith;

in response to a command to move the surface, computing a new location for each point in the first array to obtain a corresponding second array representing the moved surface;

computing a three-dimensional reference displacement between a point of the second array and a reference location spaced a reference distance apart from the point;

computing a scaled three-dimensional reference displacement by dividing the three-dimensional reference displacement by the reference distance;

for each corresponding element of the three-dimensional texture for each point of the first array, computing a corresponding three-dimensional texture displacement by multiplying the scaled three-dimensional reference distance by the texture distance associated with the element; and computing a location for each element of the three-dimensional texture associated with each point of the first array by adding the corresponding texture displacement to the location for the corresponding point in the second array.

5. A method according the claim 4 wherein the step of computing a scaled three-dimensional reference displacement for each point of the first array comprises the step of reading a scaled three-dimensional reference displacement from a lookup table based on the corresponding three-dimensional reference displacement and the corresponding reference distance.

6. A method according to claim 4 wherein the step of computing a three-dimensional texture displacement for each element of the three-dimensional texture associated with each point of the first array comprises reading a three-dimensional texture displacement from a lookup table based on the corresponding scaled three-dimensional reference displacement and the texture distance associated with the element.

7. A method according to claim 4 wherein the step of computing a three-dimensional texture displacement for each element of the three-dimensional texture associated with each point of the first array comprises reading the three-dimensional texture displacement from a multiplication lookup table based on the corresponding three-dimensional reference displacement and the normalized texture distance associated with the element.

\* \* \* \* \*